United States Patent
Shintani et al.

(10) Patent No.: US 6,721,018 B1
(45) Date of Patent: Apr. 13, 2004

(54) METHOD AND APPARATUS FOR DECREASING THE TIME REQUIRED TO GENERATE A CHANNEL MAP IN A TELEVISION SIGNAL RECEIVER

(75) Inventors: Peter Rae Shintani, San Diego, CA (US); Kenichiro Toyoshima, San Diego, CA (US)

(73) Assignees: Sony Corporation (JP); Sony Electronics, Inc., Park Ridge, NJ (US)

( * ) Notice: Subject to any disclaimer, the term of this patent is extended or adjusted under 35 U.S.C. 154(b) by 0 days.

(21) Appl. No.: 09/422,970

(22) Filed: Oct. 22, 1999

(51) Int. Cl.$^7$ .................................................. H04N 5/50
(52) U.S. Cl. ........................ 348/731; 348/732; 725/38
(58) Field of Search ................................. 348/731, 732, 348/734, 553; 725/38, 56

(56) References Cited

U.S. PATENT DOCUMENTS

| | | | |
|---|---|---|---|
| 5,933,192 A | * | 8/1999 | Crosby et al. ............... 348/837 |
| 6,118,498 A | * | 9/2000 | Reitmeier ................... 348/725 |
| 6,188,448 B1 | * | 2/2001 | Pauley et al. ............... 348/731 |

* cited by examiner

Primary Examiner—Victor R. Kostak
(74) Attorney, Agent, or Firm—Rader, Fishman & Grauer PLLC; Ronald P. Kananen

(57) ABSTRACT

In a television signal receiver having two or more tuners, initial channel mapping can be expedited by simultaneously using all tuners in parallel to map the receivable channels. A processor controls the application of television signals from one or more sources to the two or more tuners and controls the channel mapping function of both tuners simultaneously.

8 Claims, 3 Drawing Sheets

METHOD AND APPARATUS FOR DECREASING THE TIME REQUIRED TO GENERATE A CHANNEL MAP IN A TELEVISION SIGNAL RECEIVER

TITLE OF THE INVENTION

Method and Apparatus for Decreasing the Time Required to Generate a Channel Map in a Television Signal Receiver

FIELD OF THE INVENTION

The present invention relates to the field of television. Specifically, the present invention relates to the field of creating a channel map for a television signal receiver, such as a television set, set-top terminal, video cassette recorder, etc. More specifically, the present invention relates to the field of decreasing the time required to generate the channel map of receivable channels for a television signal receiver.

BACKGROUND OF THE INVENTION

When a user purchases a new television set or moves to a new location, his or her television set must create a channel map of the channels currently receivable by the television set. In other words, all the available frequencies at which television channels could be broadcast must be checked to determine where the channels available to the television set are. This is true whether the incoming television signal is from a terrestrial (over-the-air) broadcast or comes from a cable television network.

The television then stores in memory the location of the available channels as a channel map. Most modern television sets can automatically create a channel map by scanning through the available channel frequencies and noting at which an intelligible signal is received. Additionally, most modern televisions allow the user to manually add or delete channels from the channel map to optimize the map's conformance to the viewer's channel preferences. Channel maps may also be created by other devices which act as television signal receivers, for example, video cassette recorders (VCRs), set-top boxes or PC card tuners.

After the channel map is created, it is used to tune the available channels for the user. For example, when watching television, viewers typically desire to flip through the available channels to see what is being broadcast. This does not require the user to consult a television programming guide or enter a specific channel using, for example, the ten-key keypad on a remote control unit.

Surfing sequentially through the available channels is done by pressing a button on a remote control unit or on the television set itself indicating a desire to move up or down through the available channels. If, for example, the television set had been tuned to channel 4 and the user signals the television set to tune the next highest channel, the television set will consult its channel map.

The next highest receivable channel may be, for example, channel 8. Consequently, the television set skips directly from channel 4 to 8 without going to channel 5 where no broadcast is available. Thus, the channel map saves the user from successively tuning through each of channels 5, 6 and 7, where no broadcasts are available every time the user goes from channel 4 to channel 8.

If the user only receives terrestrial broadcasts of television signals, there will likely be many possible channels (or frequencies) at which no broadcast is being made, particularly if the user lives in a relatively remote area. On the other hand, if the user receives cable television signals, there may be premium, scrambled channels to which the user does not subscribe as well as available channels on which no broadcast is being made. Consequently, the user will, in any case, want the channel map to list only those channels that are clearly receivable, not those that are scrambled or only poorly received due, for example, to interference or distance.

As noted above, a channel map must be created whenever a new television set is brought into service or whenever a television set is moved to a new location where a different selection of television channels are available. Additionally, a new channel map must be created by a television set whenever there is, for any reason, a change in the selection of available television channels. For example, if a television user newly subscribes to a cable television system after using only terrestrially broadcast signals, or if a channel is added to, or dropped from, a cable network or commences or ceases over-the-air terrestrial broadcasting.

While channel maps are very useful to a viewer and make operation of the television set more efficient, channel maps also require time to create. The recent trend, particularly in cable television systems, is to provide viewers with 120 or more available channels. The amount of time and effort required to create an accurate channel map increases proportionally with the number of available channels. This situation will be further aggravated by the advent of both over-the-air and cable channels broadcast in the digital format. Using digital signals, a service provider can provide a greater number of available television channels.

Due to the more complex nature of the reception and demodulation of digital signals, the time required to automatically create a channel map increases even more.

While a channel map is being created, the user conventionally cannot tune any particular channel and watch the television. Consequently, there is a need in the art for a method and apparatus that minimize the time required to generate a channel map.

SUMMARY OF THE INVENTION

It is an object of the present invention to meet the above-described needs and others. Specifically, it is an object of the present invention to provide a method and apparatus that minimizes the time required for a television signal receiver to create a channel map of the available channels.

Additional objects, advantages and novel features of the invention will be set forth in the description which follows or may be learned by those skilled in the art through reading these materials or practicing the invention. The objects and advantages of the invention may be achieved through the means recited in the attached claims.

To achieve these stated and other objects, the present invention may be embodied and described as a method of minimizing the time required to generate a channel map for a television signal receiver that has at least two tuners. The method of the present invention is accomplished by simultaneously using both tuners in parallel to scan for receivable channels to be listed in the channel map. The method concludes by generating a unified channel map based on the output from the two or more tuners scanning for receivable channels.

The method of the present invention can be made more efficient by exploiting the characteristics of the available tuners. For example, if one of the tuners is a digital tuner and another of the tuners is an NTSC tuner, the method preferably includes scanning for receivable channels with the NTSC tuner beginning at a lowest possible channel allocation. Accordingly, scanning for receivable channels with the digital tuner is begun at the highest possible or highest commonly used channel allocation.

The method also is made more efficient by identifying a type of signal source of an incoming television signal or signals, i.e., terrestrial, cable etc. The channel mapping is then performed in accordance with the identified type of signal source of the incoming television signal or signals. There are at least two means of performing this identification, for example, (1) displaying a menu requesting user input identifying the type of signal source of the incoming signal or signals, or (2) testing the channel allocation configuration of the incoming television signal or signals.

The present invention also encompasses the apparatus required for executing the foregoing method. For example, an apparatus according to the present invention minimizes the time required to generate a channel map for a television signal receiver and may include a processor; a first tuner; a second tuner; and at least one input for a television signal. The processor controls the tuners in parallel such that both tuners simultaneously scan for receivable channels to be listed in the channel map. More than two tuners can be included.

BRIEF DESCRIPTION OF THE DRAWINGS

The accompanying drawings illustrate the present invention and are a part of the specification. Together with the following description, the drawings demonstrate and explain the principles of the present invention.

DETAILED DESCRIPTION OF THE PREFERRED EMBODIMENTS

Stated in broad principle, the present invention involves the use of two or more independent tuners, when present in a television signal receiver, to work in parallel, i.e., simultaneously, to create a channel map, thereby decreasing and minimizing the time required to generate the map. As used herein, the term "television signal receiver" or "receiver" refers to any device which incorporates a tuner for tuning a particular channel within an incoming television signal including, but not limited to, television sets, video cassette recorders (VCRs), set-top boxes PC card tuners, etc.

Figure 1:
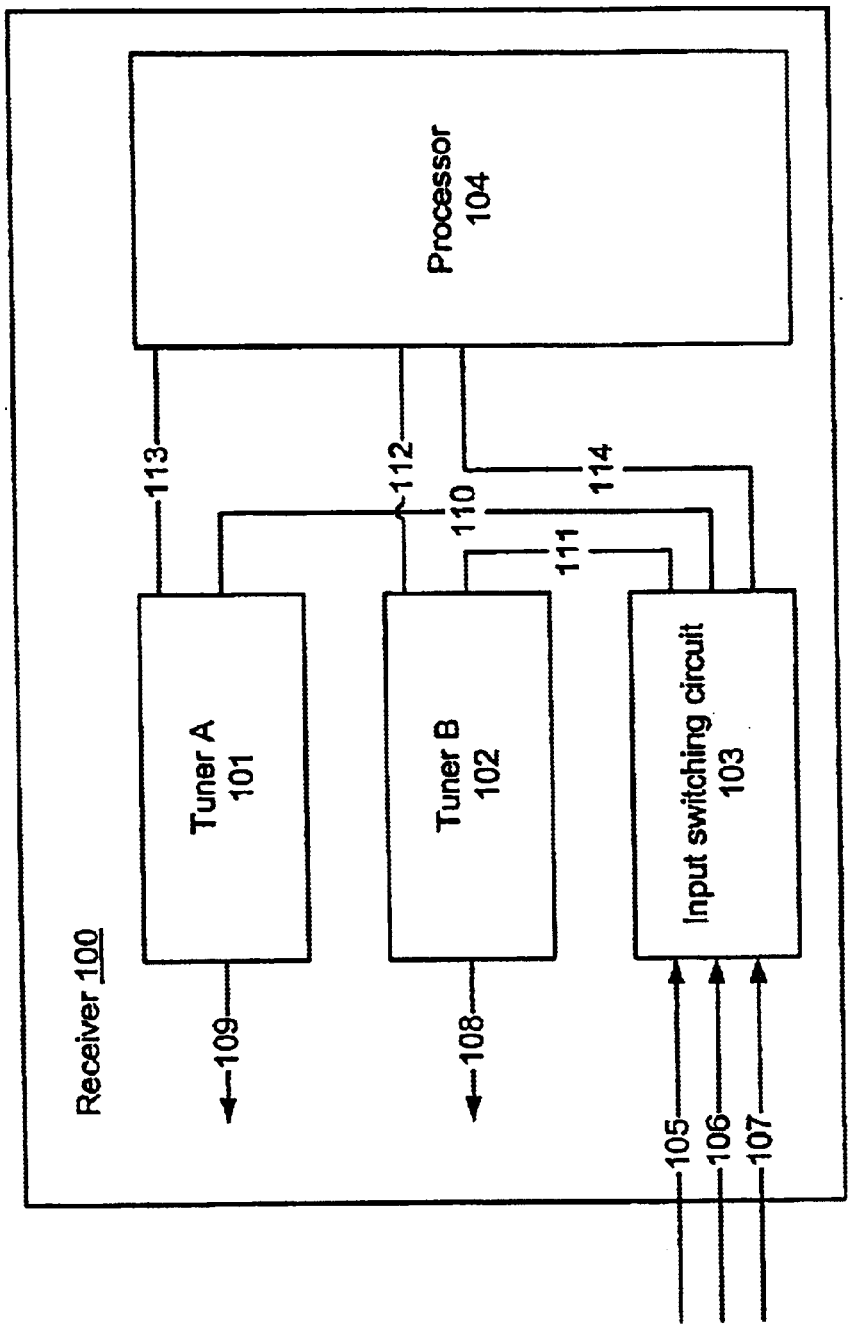
FIG. 1 is a block diagram of a television signal receiver according to the present invention.

Using the drawings, the preferred embodiments of the present invention will now be explained. As shown in FIG. 1, a television signal receiver (100) according to the present invention incorporates at least two tuners, i.e. tuner A (101) and tuner B (102). The present invention is not restricted, however, to the user of only two tuners. Three or more tuners, if present in a receiver, can be used according to the principle of the present invention. Each tuner (101, 102) has an output (108, 109) from which the signal for a specific tuned television channel is output for use by the receiver (100).

The inclusion of multiple tuners in television signal receivers is a recent development in top-of-the-line models. For example, in the case of new digital television receivers, there may be one tuner for receiving NTSC formatted signals and one tuner for receiving digital television (DTV) or high-definition television (HDTV) signals. The National Television ago Standards Committee (NTSC) is responsible for setting television and video standards in the United States. Consequently, the NTSC standard currently defines the format for analog television signals broadcast in the United States and Japan.

Figure 1A:
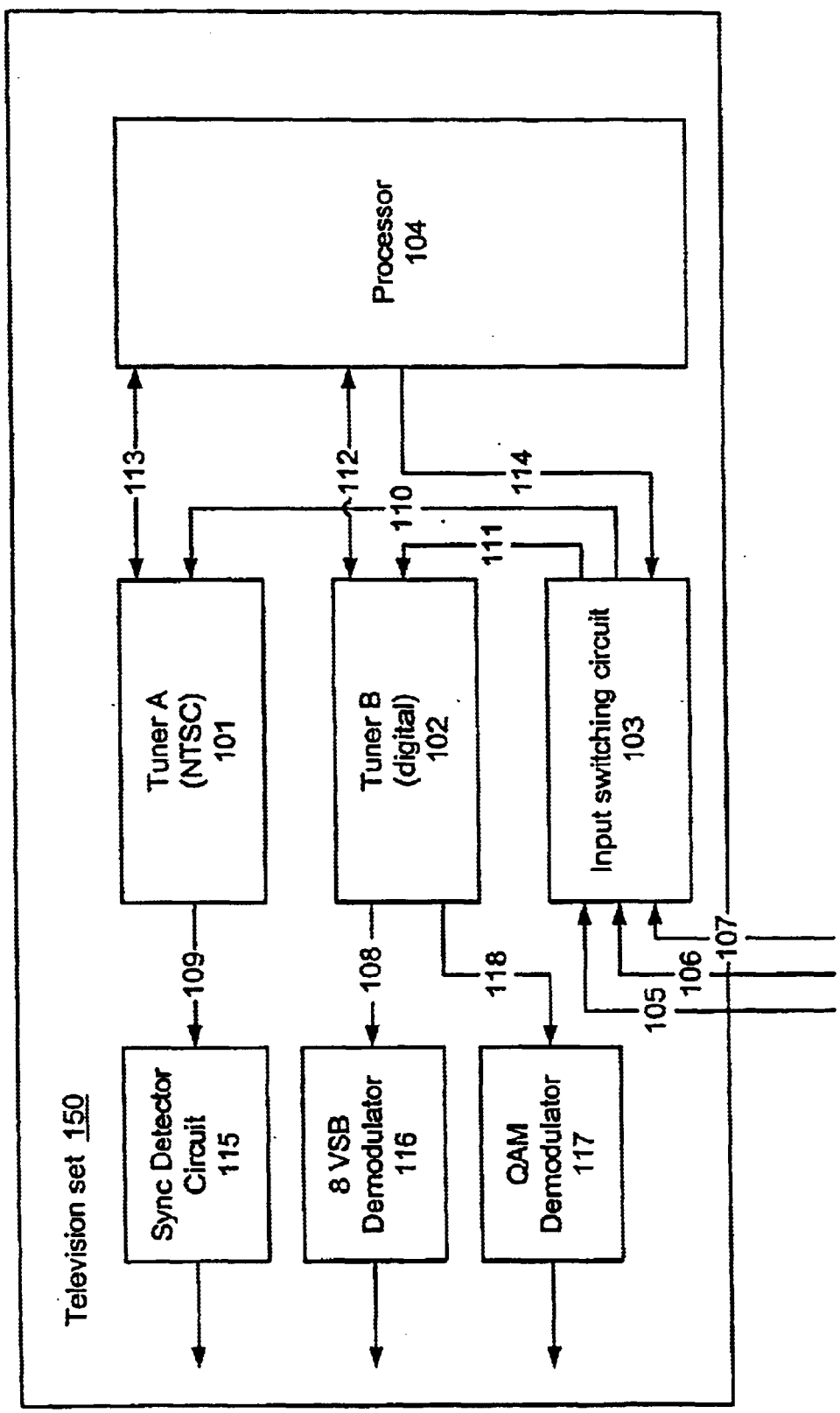
FIG. 1A is a block diagram of an exemplary television set according to the present invention

FIG. 1A illustrates a television set (150) according to the present invention in which tuner A (101) is an NTSC tuner and provides its output signal (109) to a sync detector circuit (115). Tuner B (102) is a digital tuner which provides an output (108) to a VSB demodulator or an output (118) to a QAM demodulator depending on the how the digital signal is modulated. The demodulators (116, 117) then output a demodulated signal useable by the television set (150).

There are generally three possible sources for an incoming television signal, a signal from an antenna receiving terrestrially broadcast over-the-air signals (105), a signal from a satellite dish receiving a television signal transmitted via satellite (106), and a signal from a cable television network (107). As shown in FIG. 1, a television signal receiver (100) may be simultaneously connected to one, two or all three of these signal sources.

The three signal sources (105, 106 and 107) may be connected to the receiver (100) through an input switching circuit (103). The purpose of the input switching circuit (103) is to selectively provide an incoming television signal from one of the three signal sources (105, 106 and 107) to either of the two tuners A or B (101, 102). Consequently, the switching circuit (103) is connected via line (110) to tuner A (101) and via line (111) to tuner B (102).

As shown in FIG. 1, the switching circuit (103), tuner A (101) and tuner B (102) are all controlled by a central processor (104). The processor is consequently connected by line (113) to tuner A (101), by line (112) to tuner B (102) and by line (114) to the switching circuit (103). The processor (104) is responsive to the input from the user, either through a remote control unit (not shown) or a user controls on the receiver (100) itself. Consequently, the user can, through the processor (104), direct the receiver (100) as to the desired source of television signal (105, 106 or 107) and the channel to be tuned within that signal by one of the tuners (101, 102).

When a channel map is to be created, the processor (104) will use the two tuners (101, 102) in parallel to scan the range of available frequencies and locate receivable channels. Under the principles of the present invention, the processor (104) can control the switching circuit (103) and the two tuners (101, 102) so as to simultaneously tune different channels with the two tuners (101, 102).

To optimize the parallel operation of the two tuners (101, 102), it is necessary to eliminate the unnecessary re-tuning of a channel that has already been incorporated into the channel map. Typically, the scan of available frequencies is executed sequentially. Consequently, if two tuners are available as in FIG. 1, one tuner will begin channel mapping at the lowest frequency where a channel may be located and move upward through the applicable frequency band (terrestrial, cable or satellite). Conversely, the other tuner will begin channel mapping at or near the highest frequency in the band and move downward through the frequency band. In this way, the two tuners (101, 102) are least likely to waste time by twice identifying a receivable channel for the channel map.

Additionally, if the two tuners are intended for different purposes and, perhaps, have different characteristics, these differences should be exploited to optimize the joint search for receivable channels for the channel map. For example, the tuning speed and detection of a valid signal is faster for an NTSC tuner, than the tuning and detection of a valid digital signal. Moreover, the majority of digital television signals are either quadrature amplitude modulated (QAM) signals carried over a cable network or vestigial side band (VSB) signals terrestrially broadcast in the ultra-high frequency (UHF) range terrestrial.

Consequently, if, for example, as illustrated in FIG. 1A, tuner A (101) is designed to tune NTSC signals, tuner A (101) should be used to begin channel mapping at the low end of the applicable frequency band where NTSC signals are most likely to be found. Conversely, if tuner B (102) is designed to tune digital signals, tuner B (101) should be used to begin channel mapping at or near the high end of the applicable frequency band where digital signals are most likely to be broadcast.

Tuner B (101) may start near (rather than at) the top of the applicable frequency band because most cable system infrastructures are not currently capable of supporting the highest permitted frequencies. The Federal Communications Commission (FCC) only permits the use of channels 1 through 125 for NTSC video programs. Higher frequencies can be used for digital services, of which only digital video is of interest in this discussion. Consequently, these top frequencies typically above 750 MHz can be given a lower priority in channel mapping.

An alternative method under the present invention for minimizing the interruption to use the receiver (100) during channel mapping is as follows. One of the two tuners, e.g. tuner A (101), will tune a channel as directed by the viewer input to the processor (104). The signal for the tuned channel is output for use by the receiver on line (109) from tuner A (101). Simultaneously, tuner B (102) performs the channel mapping. While the time required to create a channel map will be greater with only tuner B (102) performing the mapping, the user will be able to make use of the receiver (100) without waiting for the mapping to be completed.

Additionally, the time required for channel mapping can be further decreased by avoiding fine tuning each channel during the initial channel mapping. Rather, the location of each receivable channel in the applicable frequency band will only be roughly identified during the initial channel mapping.

Then, when the user requests the tuning of any particular channel, the fine tuning required to optimally receive that channel will be completed and the additional tuning data added to the channel map. In this manner, the time required for the initial channel mapping is decreased and, effectively, spread out over the user's subsequent user of the receiver to tune specific channels of interest.

Depending on the variety of signal sources (105, 106 or 107) connected to the receiver (100), there are numerous scenarios for the applicable frequency band(s) to be scanned during channel mapping. NTSC format signals are available on both over-the-air terrestrial broadcasts and cable broadcasts. Despite the rise of digital format signals, NTSC analog signals will likely still be broadcast for a long time to come as the slow conversion to digital takes place. QAM digital signals are never broadcast terrestrially by FCC rule.

If just terrestrial and cable sources for television signals are considered, there are approximately 14 different scenarios for channel mapping. For example, if the receiver (100) only receives terrestrially broadcast signals, channel mapping will be performed for over the (1) terrestrial NTSC band or, where digital broadcasts are available, for the (2) terrestrial NTSC band and the 8 VSB band.

If the receiver (100) only receives cable network signals, channel mapping might be performed over (1) the cable NTSC band only, (2) the cable NTSC band and the cable 8 VSB band, (3) the cable NTSC band and the cable QAM band or (4) the cable NTSC band, cable 8 VSB band and cable QAM band. Which of these scenarios applies will depend on the offerings of the cable service provider. Some cable service providers will provide only NTSC signals, while others will provide NTSC signals with QAM and/or 8 VSB signals.

If both cable and terrestrial signal sources are provided to the receiver (100), the following possible combinations of channel bands might be available for channel mapping: (1) cable NTSC and terrestrial NTSC; (2) cable NTSC, terrestrial NTSC and terrestrial 8 VSB; (3) cable NTSC, cable 8 VSB and terrestrial NTSC; (4) cable NTSC, cable 8 VS8, terrestrial NTSC and terrestrial 8 VSB; (5) cable NTSC, cable QAM and terrestrial NTSC; (6) cable NTSC, cable QAM, terrestrial NTSC and terrestrial 8 VSB; (7) cable NTSC, cable 8 VSB, cable QAM and terrestrial NTSC; and (8) cable NTSC, cable 8 VSB, cable QAM, terrestrial NTSC and terrestrial 8 VSB.

Figure 2:
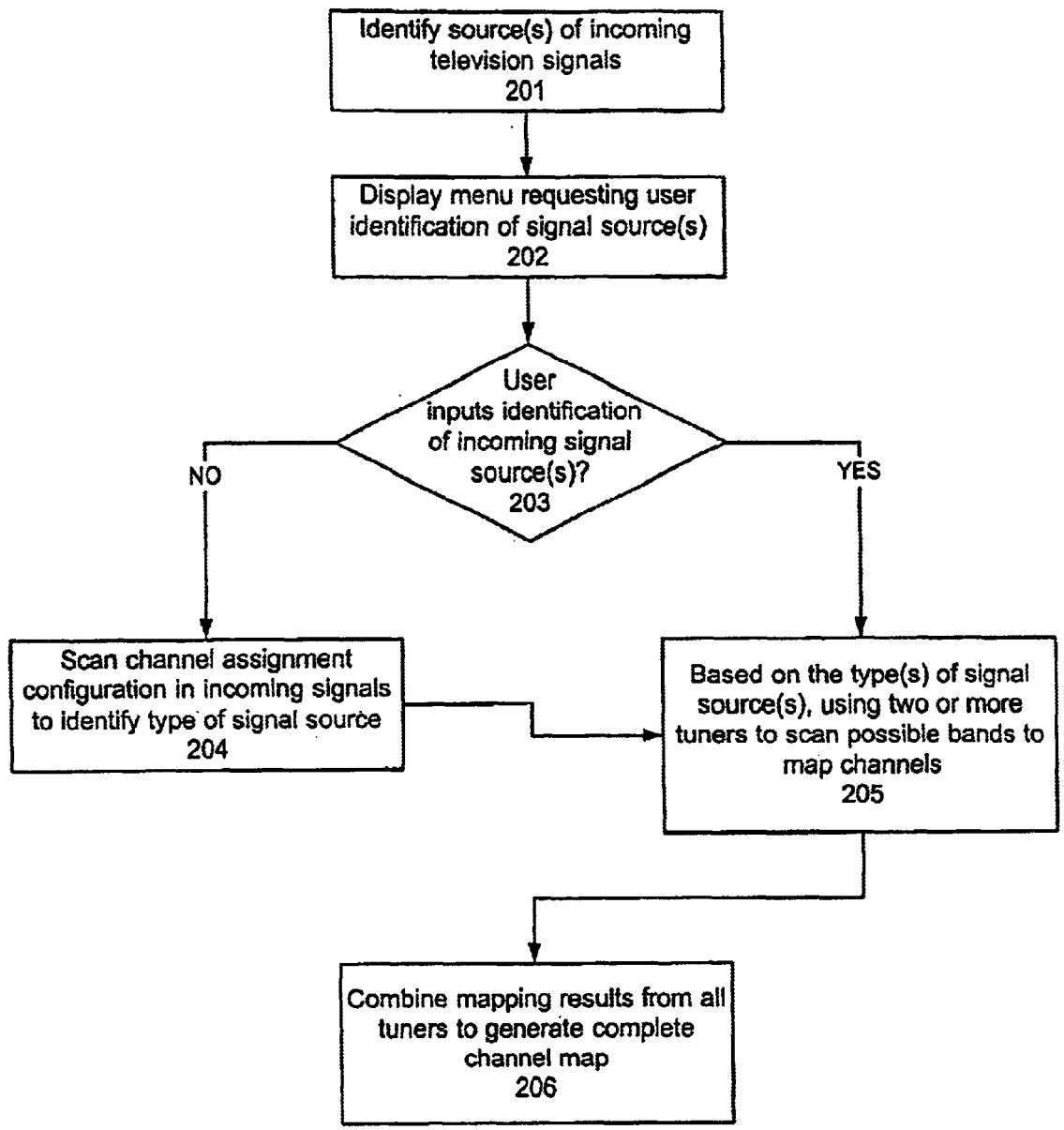
FIG. 2 is a flowchart illustrating an algorithm for channel mapping according to the present invention.

Given these various scenarios, an algorithm according to the present invention may be as follows. As shown in FIG. 2, the processor (104) should first identify the source or sources of the incoming television signals, namely terrestrial, cable or satellite, to determine how to best perform the channel mapping (201). There are two general methods by which the processor (104) can determine the sources of the incoming television signals. For example, if the receiver (100) is a television set or is connected to a television set and can control the television set, the processor (104) may display a menu requesting the user to identify the source of television signals supplied to the receiver (100) (202).

If the receiver (100) is unable to display such a request for information or the user fails to respond (203), the processor (100) can scan the channel assignment configuration of the incoming signal to identify the type of signal it is (204). For example, the channel assignment configuration is different for a cable television signal than for a signal derived from a terrestrial over-the-air broadcast.

Given at least two inputs for television signals to the receiver (100), a user could provide a variety of input combinations. For example, the user may connect a cable feed to both antenna switch inputs. In such a scenario, one input may be via a cable box for scrambled channels, while the other input is direct to the cable system for unscrambled channels.

Similarly, both inputs could be a terrestrial feed, one from a VHF antenna and another from a UHF antenna. There are many possible combinations. However, since the terrestrial channel frequency assignment is different from the cable channel frequency assignment tuning a few channels on either channel plan will provide an indication of whether that input is cable or terrestrial. If the signal is via a VCR or a cable box, the channel will be static.

Once the type of signal feed or feeds is determined and associated with each antenna input, the tuners (101, 102) can start their respective scans of their respective channel plans (205). As mentioned earlier, the NTSC channels will most likely occupy the lower channel numbers and the digital programs will most likely occupy the higher channel numbers. Consequently, an NTSC tuner, if present, will preferably be used to scan starting at the lowest channel number because an NTSC tuner is capable of tuning and detecting the presence of an analog signal faster than a digital tuner. A digital tuner, if present, will preferably be used to scan for receivable channels starting at or near the highest channel numbers.

As soon as either tuner detects the presence of a valid, receivable channel, the processor (104) will update the unified channel map memory (206). The map will also specify which channels carry an analog NTSC signal, 8 VSB digital signal or a 64/256 QAM digital signal. As each tuner and its associated signal detection circuit find their respective channels, the unified channel map memory is filled up. Thus, each tuner does not need to scan all the channels.

As noted, digital channel signals may be in the 8 VSB or QAM formats and may be transmitted terrestrially or via a cable network. When there are two different digital channel signal sources, the processor (104) may be required to switch the feeds between the tuners (101, 102) or between a common digital tuner and different digital demodulators (108, 118), to find the appropriate hardware for receiving VSB as opposed to QAM signals, and vice versa. In some instances a common digital demodulator will be provided for both 8 VSB and QAM. However, there is a down time associated with the switching of the demodulation mode of a common digital demodulator between VSB and QAM modes, so it is more likely that the use of a common digital demodulator will be done sequentially, i.e. all mapping of potential VSB channels preformed before mapping of any possible QAM channels, or vice versa.

Since cable operators have officially decided to use the QAM signal format as a standard, when cable channels are being scanned using a common digital demodulator scanning in the QAM mode should be done first. Conversely, when scanning the terrestrial channels, QAM signals will not be present. Therefore, only 8 VSB need be scanned.

The preceding description has been presented only to illustrate and describe the invention. It is not intended to be exhaustive or to limit the invention to any precise form disclosed. Many modifications and variations are possible in light of the above teaching.

The preferred embodiment was chosen and described in order to best explain the principles of the invention and its practical application. The preceding description is intended to enable others skilled in the art to best utilize the invention in various embodiments and with various modifications as are suited to the particular use contemplated. It is intended that the scope of the invention be defined by the following claims.

What is claimed is:

1. A method of minimizing the time required to generate a channel map, comprising the steps of:

simultaneously using a plurality of tuners in parallel to scan a range of available frequencies and locate receivable channels, and generating a unified channel map of said receivable channels based on output from said plurality of tuners without re-tuning a channel of said receivable channels that has been incorporated into said unified channel map.

2. The method of claim 1, wherein one of said plurality of tuners is a digital tuner and another one of said plurality of tuners is an analog tuner, the method further comprising scanning for receivable channels with said analog tuner beginning at a lowest possible channel allocation.

3. The method of claim 2, further comprising:

scanning for receivable channels with said digital tuner beginning at a highest possible channel allocation.

4. The method of claim 2, further comprising:

scanning for receivable channels with said digital tuner beginning at a highest commonly used channel allocation.

5. The method of claim 1, further comprising:

identifying a type of signal source of an incoming television signal or signals, wherein said channel map is generated in accordance with said type of signal source of said incoming television signal or signals.

6. The method of claim 5, wherein said identifying a type of signal source comprises displaying a menu requesting user input identifying said type of signal source of said incoming signal or signals.

7. The method of claim 5, wherein said identifying a type of signal source comprises testing a channel allocation configuration of said incoming television signal or signals to identify said type of signal source of said incoming signal or signals.

8. An apparatus for minimizing the time required to generate a channel map, comprising:

a processor;

at least two tuners; and at least one input for a television signal, wherein said processor controls said at least two tuners in parallel such that said at least two tuners simultaneously scan a range of available frequencies and locate receivable channels, and wherein said processor generates a unified channel map of said receivable channels based on output from said at least two tuners without re-tuning a channel of said receivable channels that has been incorporated into said unified channel map.

* * * * *